United States Patent [19]

Papadopoulos

[11] Patent Number: 4,601,370
[45] Date of Patent: Jul. 22, 1986

[54] DRIVE RELEASE BRAKE ASSEMBLY

[76] Inventor: George E. Papadopoulos, Rua Visonte De Piraza 284 Apt. 701, Ipanama, Rio De Janeiro, Brazil

[21] Appl. No.: 385,475

[22] Filed: Jun. 7, 1982

[51] Int. Cl.⁴ ............................................. B60K 41/20
[52] U.S. Cl. .................................... 192/8 R; 188/134; 254/378
[58] Field of Search .................... 192/7, 8 A, 8 R, 15, 192/18 R; 254/375, 378, 356, 366; 188/134, 72.7

[56] References Cited

U.S. PATENT DOCUMENTS 2,834,443 5/1958 Olchawa ............................ 192/8 R
4,280,605 7/1981 Papadopoulos ................... 192/8 R
4,485,901 12/1984 Papadopoulos ................ 188/134 X Primary Examiner—Rodney H. Bonck
Attorney, Agent, or Firm—Lockwood, Alex, Fitzgibbon & Cummings

[57] ABSTRACT

A drive release brake assembly for controlling rotation includes a wedge member carried between a pair of substantially planar facing cam plate surfaces by an axial core member. The wedge member is prevented from rotating about the core member and include axially extending, rotatable cylinders which extend into contact with the cam surfaces. When the cam surfaces are aligned, the cylinders ride on the cam surfaces to permit relative rotation between the cam surfaces and the core member. When the cam surfaces are moved out of alignment, the distance between them is less than the axial length of the wedge member, causing the cylinders to wedge tightly between the cam surfaces. Because the wedge member is prevented from rotating relative to the core member, when it is wedged or locked between the cam surfaces, the latter are also prevented from rotating relative to the core member.

22 Claims, 6 Drawing Figures

FIG. I

DRIVE RELEASE BRAKE ASSEMBLY

BACKGROUND AND SUMMARY OF THE INVENTION

The present invention relates generally to mechanical drive release brake assemblies to control the relative rotation between two rotary members and, more particularly, relates to such assemblies used in hoists or the like which require an automatic braking system in order to prevent accidental release.

Hoists have numerous uses in various machinery such as elevators, cranes, winches, and the like. They can be mechanically or electrically driven and can be used in conjunction with a pulley, spool, or hub in order to recover and dispense line or with a winch to just recover the line. In many uses, it is desirable that the drive assembly used in hoist controls be easy to operate, reliable, and durable. It is also desirable, and at times imperative, that the drive assembly have an automatic brake in order to prevent accidental release of the hoist line in case of drive motor failure.

It is an object of the present invention to provide a drive release brake assembly which is sturdy and reliable, but simple in construction and easy to operate and maintain.

It is another object of the invention to provide a drive release brake assembly which can be employed in a hoist which has forward, as well as reverse motion, and which automatically locks in either direction in case of motor failure.

Yet another object of the present invention is to provide a drive release brake assembly which can be employed in conjunction with a drum to recover line, a winch or the like.

These and other objects, features and advantages of the invention will become clear upon consideration of the following detailed description of a preferred embodiment of the invention.

BRIEF DESCRIPTION OF THE DRAWINGS

In the course of this description, the drawings will be frequently referred to in which.

DETAILED DESCRIPTION OF THE PREFERRED EMBODIMENT

Figure 1:
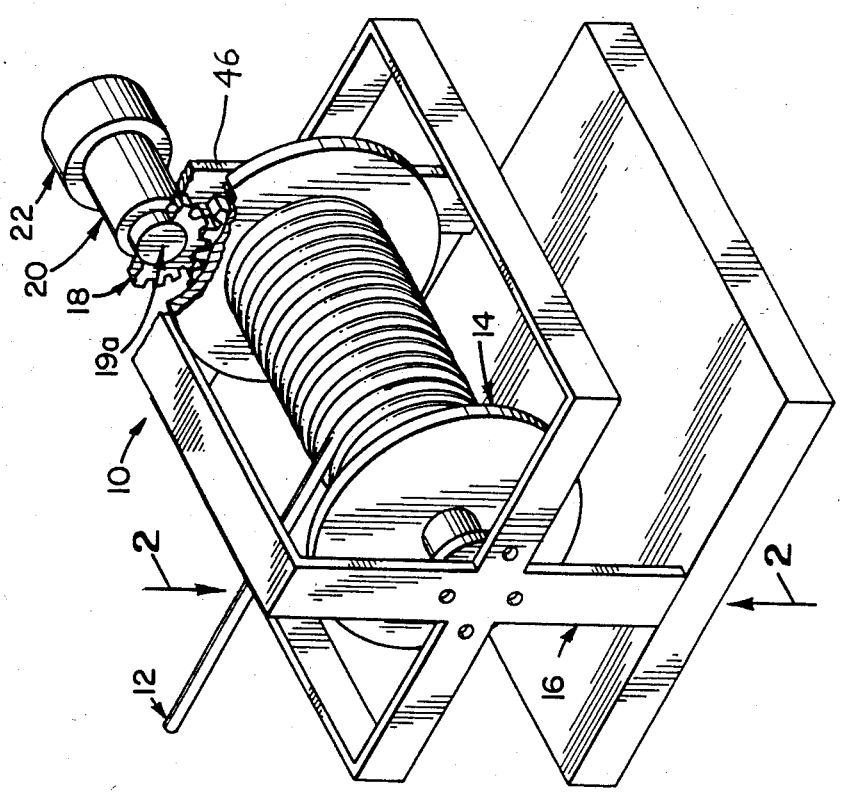
FIG. 1 is a perspective, partially broken view of a hoist employing a preferred embodiment of the drive release brake assembly of the invention.

A preferred embodiment of the present invention is shown in the attached drawings incorporated in a hoist 10 to retrieve and release cable 12 of a spool or rotary drum 14. The hoist 10 is mounted on a support frame 16 only for illustration purposes. Naturally, the actual mounting would depend on the particular use to which the hoist 10 would be put to use, for example, in a crane on board a ship or in an elevator. In the method of operation illustrated, the hoist 10 is driven by a gear 19a mounted on an axle 22, the latter of which is supported on a bearing 20 on the frame 16 or by another support system depending on its use. The gear is driven by suitable means, such as a crank, motor or engine (not shown).

Figure 6:
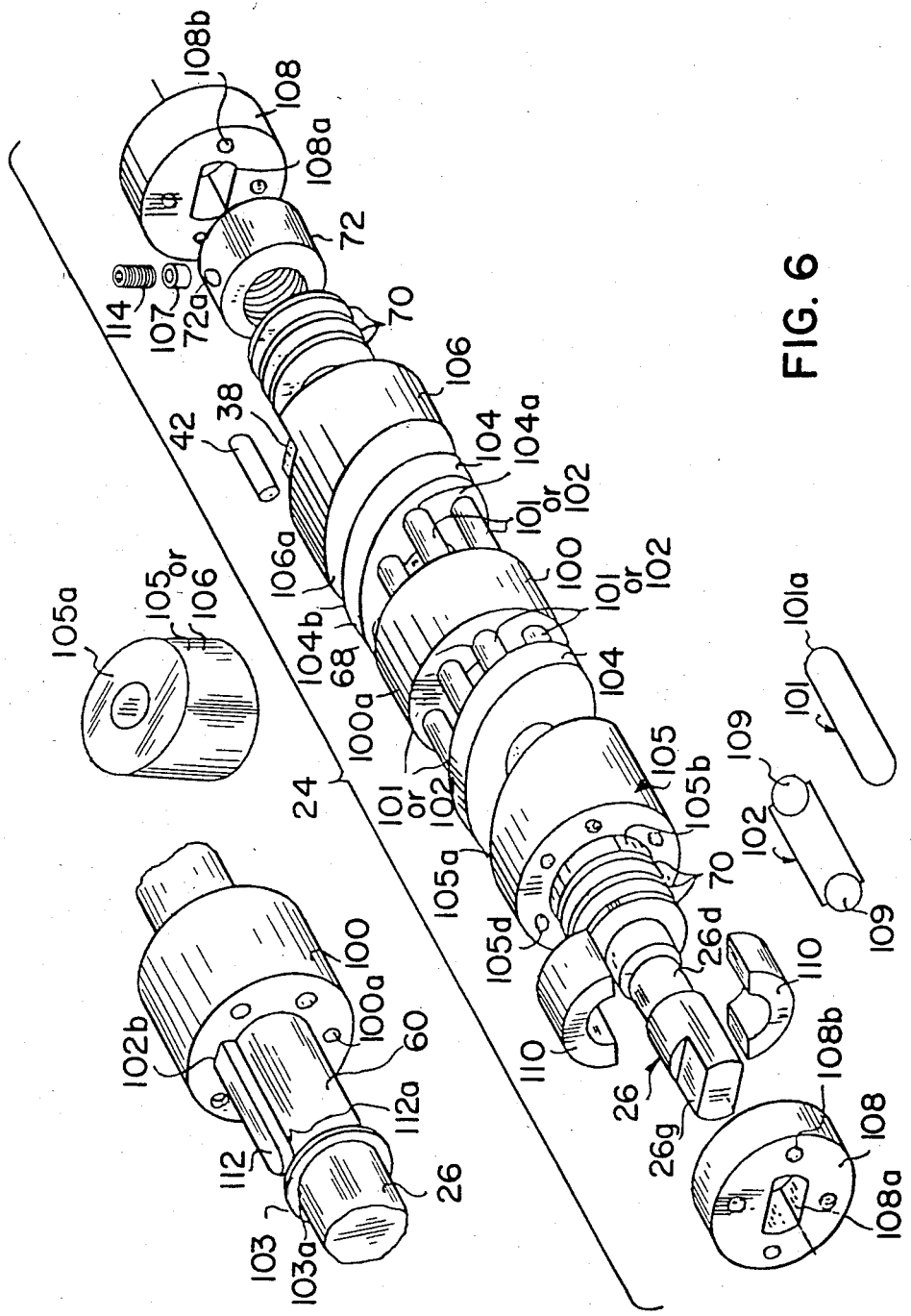
FIG. 6 is an exploded perspective view of the drive release brake assembly of the hoist shown in FIG. 1.

In accordance with the invention, a sturdy drive release brake assembly is provided which is easy to operate and to control the rotation of the drum 14 in any direction and to firmly and automatically lock the drum against rotation once the motor fails or any other interruption occurs, for example, a power failure or when it is simply turned off. The drive release brake assembly has an axial core 26 mounted in a cylindrical bore 28 in the cable hub of the drum 14. A bored component 100, mounted on the axial core 26, is fixed and prevented from axial motion by elastic rings 103 housed in the openings 103a of the axial core 26 as shown in FIG. 6. The bored component 100 has a series of cylindrical axial holes 100a into which either cylinders 101 with spherical ends 101a, or cylinders 102 with spherical balls 109 mounted in each extremity of the cylinder as shown in FIG. 6, slide and revolve. The spherical extremities 101a of the cylinders or balls 109 at the ends of the cylinders opposite axial holes 100a are supported in concave channels 104a on a substantially planar cam surface in cam discs 104, the latter of which are mounted in spaced relationship on the axial core 26. Also positioned in spaced relationship along the core 26 are cam cylinders 105 and 106, respectively, having slanted planes 105a or 106a. Sliding discs 70, which revolve on the axial core 26 are mounted on an indentation 105b in slanted cam cylinder 105 opposite the inclined plane 105a. The slanted cam cylinder 105 is attached to the side of the drum 14 by screws in indentations 105d or by pins fastened in the indentations 105d and in the side of the drum. Slanted cam cylinder 106 also revolves around the axial core 26, the latter of which is mounted in a central opening opposite the inclined plane. Discs 70, which also revolve around the axial core 26, are positioned in indentation 106b and prevented from detachment from the indentation 106b by a nut 72 which is attached to the axial core 26 by a cylinder 107 which is held in place by a screw 114, both being mounted in a threaded hole 72a as shown in FIG. 6.

Figure 2:
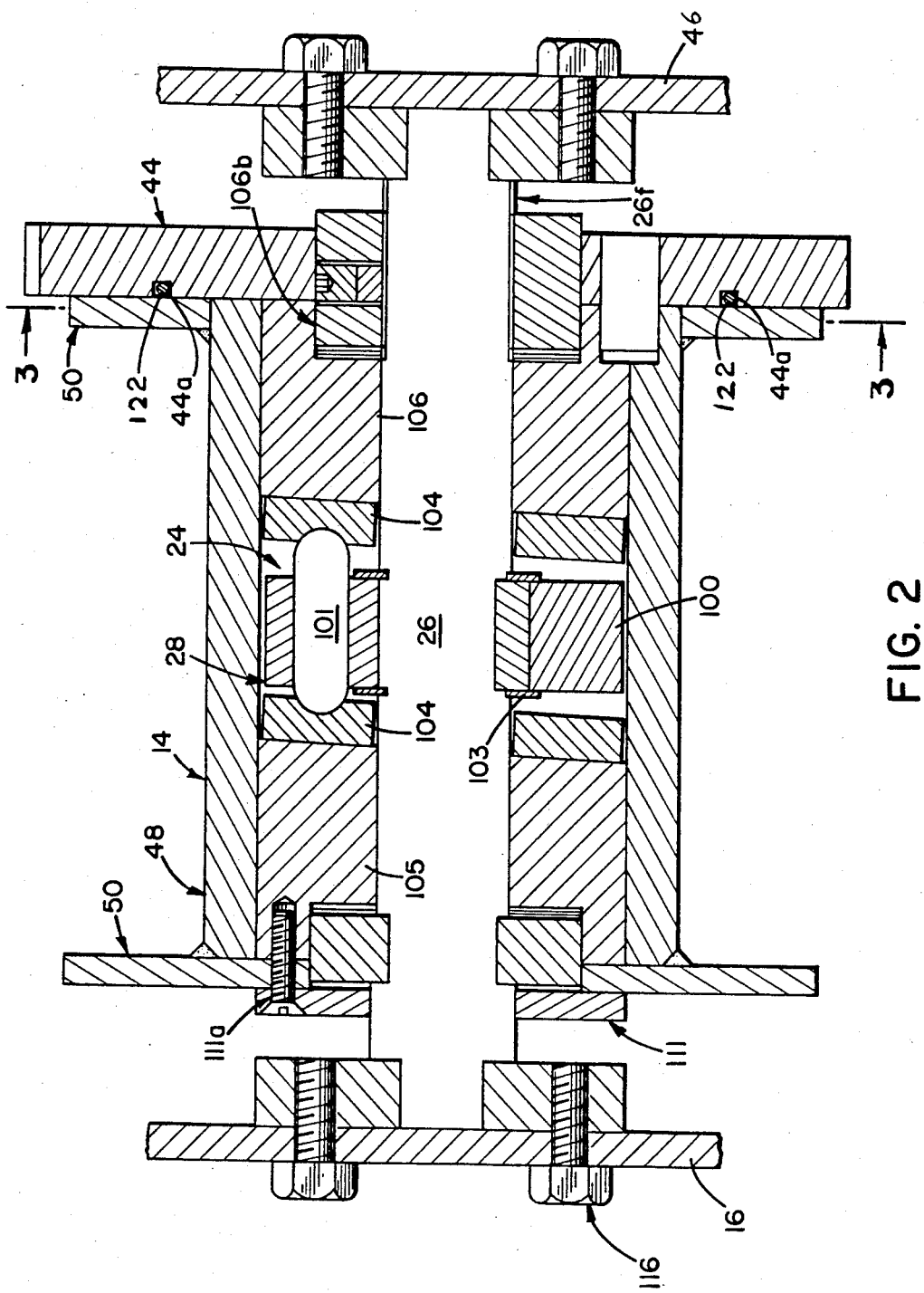
FIG. 2 is a cross-sectioned front elevation view of the hoist as viewed substantially along line 2—2 in FIG. 1.

The axial core 26 is prevented from revolving because its extremity 26g is positioned in the opening 108a of supports 108, the latter of which are attached to the frame 16 by screws through holes 108b. The assembly is protected by a plate 111 as shown in FIG. 2 attached to the drum 14 by screws through the openings 111a and 105d and by a rubber ring 112 housed in an indentation 44a of the gear 44, the latter of which are shown in FIG. 2.

The surfaces 105a and 106a of slanted cam cylinders 105 and 106 are spaced from each other such that when the surfaces of the cylinders are aligned at a 108-degree angle, i.e. with the highest part of one cylinder surface opposite to the lowest surface of the other cylinder, a small space is left between the slanted cam surfaces of the cam discs 104. However, when the cylinders are revolved out of alignment, the cylinders 101 and 102 are wedged between the cam surfaces of parallel cam discs 104 in order to lock the cylinders against rotation in relation to the axial core.

Figure 3:
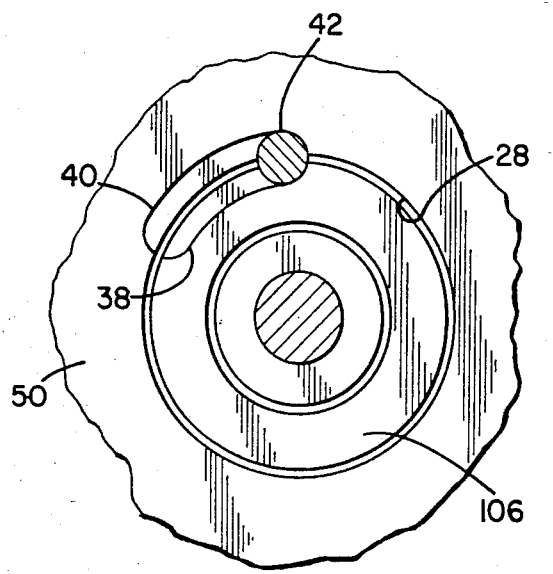
FIGS. 3 and 4 are vertical plan views, broken away from the rest of the hoist, as viewed substantially along line 3—3 of FIG. 2, which show the feature of the present invention for unlocking and locking the clutch assembly respectively.
Figure 4:
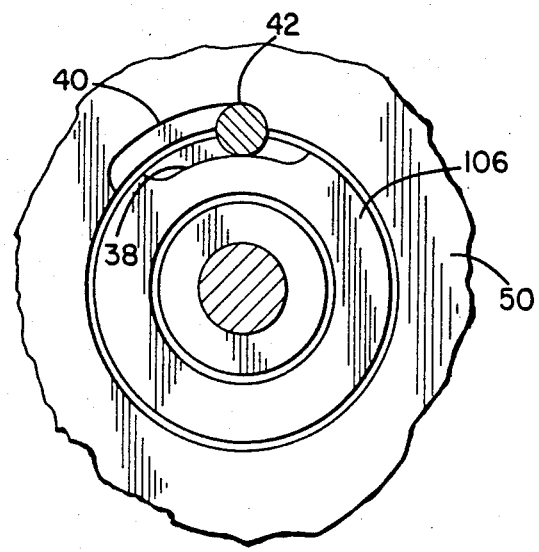
Figure 5:
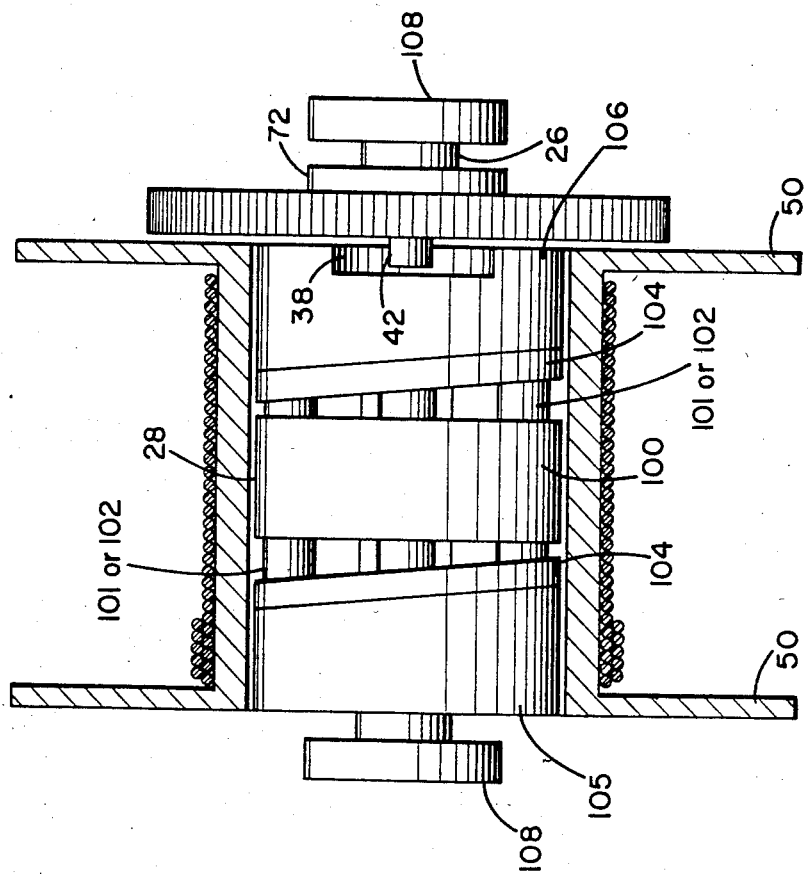
FIG. 5 is a horizontal sectioned view of the hoist assembly shown in FIG. 1.

Slanted cam cylinders 105 and 106 are displaced from their angularly aligned position, as shown in FIGS. 3, 4 and 5, by alignment of parallel grooves 38 and 40 in the peripheral edge of slanted cam cylinder 106 and drum 14. A pin 42 secured to the motor gear 44 extends into the space between the grooves 38 and 40 and rotation of the motor gear in whatever position causes the pin 42 to meet and align the extremities of the grooves. The slanted cam cylinder 105 is welded or secured in any suitable manner to the drum 14 in such a way that when the extremities of the grooves 38 and 40 are aligned, the slanted cam cylinders 105 and 106 are in angularly aligned relationship to each other. When the drive of the drum is stopped, either accidentally or intentionally, the slanted cam cylinders 105 and 106 rotate slightly into an unaligned position, closing the spacing between the cylinders 101 or 102 to the cam surfaces of the cam discs 104 and preventing the rotation of both the cylinders and the drum 14 in relation to the axial core 26.

Returning now to a more detailed description of the attached drawings, in the illustrated hoist, the retrieving drum 14 is shown between a pair of straight support frame arms 46 and 16. As mentioned previously, this mounting is simply for illustration purposes, and can be changed according to need and for whatever purpose the invention might be employed. The drum 14 includes a cylindrical hub 48 with straight radial flanges 50 on each extremity in order to retain the cable 12 on the drum. The drive release brake assembly 24 of the present invention is enclosed within a cylindrical axial bore 28 through the hub 48 of the drum. The axial core extends to each extremity of the drum and is connected to the straight arms 46 of the frame support 16. As shown in FIG. 2, the extremities of the axial core 26 are housed in the openings 108a of the discs 108 which are, in turn, attached to the frame structure 16 by bolts 116 as shown in FIG. 2, and thus prevent the rotation or axial movement of the axial core 26.

As briefly described above, the drive release brake assembly 24 is firmly encased in the bore 28 of the cable drum 14. FIG. 6 shows the axial core 26 with the other components of the clutch-brake in detail. The axial core 26 is generally long and cylindrical. It is threaded adjacent one end for the mounting of the slanted cam cylinders 105 and 106 by a nut 72 and has a centrally located cylindrical part 60 which extends through the bored component 100 and slanted cam cylinders 105 and 106 and is made of high-resistance steel. The bored component 100 is attached and prevented from revolving about the axial core 26 by axle-pins 112 housed in the spaces 112a of the axial core 26 and 102b of the bored component 100 as shown in FIG. 6 and axial movement of component 100 is prevented by elastic rings 103 housed in the spaces 103a of the core 26. The bored component 100 has a series of cylindrical axial bores 100a which receive cylinders 101 with spherical extremities 101a or cylinders 102 with spherical balls 107 mounted in each extremity of the cylinders for sliding and rotating movement of the last-mentioned cylinders in bores 100a. Naturally, the number of cylinders 101 or 102 in each component may be varied according to use. Thus, the non-rotating bored component 100 with its cylinders 101 or 102 actually defines a wedge element which cooperates with the substantially planar cam surfaces of cam discs 104 to brake the assembly.

The size of the cylinders 101 and 102 is determined by the length of the bores 100a in component 100. The diameter of the cylinders 101 and 102 should be slightly smaller than the bores in component 100 to allow for sliding, rotation and axial displacement to occur within the bores 100a of component 100. In addition, cylinders 101 and 102 jointly should be a total length, measured along the axial core, sufficient to allow their closest point to extend close to the sides of the bored component 100 and for the ends of cylinders 101 or 102 to extend into the channels 104a of the discs 104. It is only necessary that the cylinders 101 or 102 extend beyond the bores 100a sufficiently to allow them to touch the channel surfaces 104a of the cam discs 104 and, preferably, the cam surfaces of the cam discs 104 do not touch or rub against the extremities of component 100.

Each slanted cam cylinder 105 and 106 has a central bore for positioning on the axial core 26. The cam surfaces of the parallel cam discs 104 are identical, but the spacing between the discs 104 will change when they are rotated from their parallel alignment causing the slanted cylinders to quickly lock. That is, when the cam discs 104 are revolved out of alignment, the assembly is braked or locked.

Slanted cam cylinder 105 is mounted over axial core 26 by its central bore and prevented from axial movement by sliding washers 70 which are housed in the indentation 105b and kept there by semi-sleeves 110 housed in the indentation 26d of axial core 26 as shown in FIG. 6. The position of the slanted cam cylinder 105 in relation to the component 100 is maintained by the axial force exercised by cam disc 104 on the surface 105a.

The slanted cam cylinder 106 is mounted over axial core 26 by its central bore and prevented from axial movement by the sliding washers 70 which are housed in the indentation 106b and maintained there by a cylindrical nut 72 attached to the axial core by threading onto section 26f of the core as shown in FIGS. 2 and 6. The position of the slanted cam cylinder 106 in relation to component 100 is maintained by the axial force exercised by disc 104 on the surface 106a.

The slanted cam cylinders 105 and 106 and the cam discs 104 are mounted such that the cylinders 101 and 102 stay positioned and supported in the channels 104a and allows rotation of the cylinders and the radial sliding of the cam discs 104. That adjustment is made by the advance or backward movement in relation to the component 100 of the cylindrical nut 72 which, after adjustment, is rigidly attached to the axial core 26 by cylinder 107 which is attached by the screw 114. In brief reference to FIG. 2, a locking nut is not necessary for nut 72 because disc 108 prevents accidental loosening of the nut 72.

Except for the parts at the extremities of the axial core, all of the assembly 24 shown in FIG. 6 is mounted in bore 28 in the drum 14 with the external surfaces of the slanted cam cylinders 105 and 106 flush with the drum flanges 50 as shown in FIGS. 2 and 5. In order to control the rotation of the drum, the slanted cam cylinder 105 is firmly connected to the drum by welding, screws, or the like. Movement of the slanted cam cylinders to an aligned angular position in order to free the drum to dispense the cable is accomplished by the use of a pin 42 to align the extremities of the parallel grooves 38 and 40 on the peripheral external rim of the slanted cam cylinder 106 and on the interior of hub 48, respectively. This is probably shown best in FIGS. 2, 3 and 4. Pin 42 is firmly attached to the motor gear 44 which is driven by gear 18 which, in turn, is driven by axle 22. Pin 42 resides in an opening which is defined by the two parallel grooves 38 and 40. The slanted cam cylinder 105 is welded or otherwise attached to the drum 14 in an appropriate angular position in relation to space 40 in such a way that when the groove extremities between the drum and the slanted cam cylinder 106 are aligned, the slanted cam cylinders can be aligned in an angular position which allows rotation of the slanted cam cylinders and, thus, of the drum in relation to the axial core 26. Movement of the gear 44 in either forward or reverse, causes movement of the pin 42 within the space, which causes the alignment of the groove extremities, thus, freeing the drum to roll or unroll the cable. If the gear stops for some mechanical reason so that the pin stops forcing the groove extremities to align, the tension on cable 12 causes the slanted cam cylinder 106 to immediately move out of the aligned angular position as shown in FIG. 4. When this happens, the space between the surfaces of cam discs 104 becomes smaller than the length of cylinders 101 or 102, resulting in at least one cylinder 101 or 102 being tightly wedged between the surface of the discs, locking them and the drum from rotating in relation to the axial core 26. Thus, the component 100 and its cylinders 101 or 102 actually define a wedging assembly for locking the drum against further rotation. Because the core is fixed in relation to the support frame 16, the rotation of the drum is also prevented in relation to the support frame.

In order to clearly visualize the operation of the drive release brake assembly, when the surfaces of the slanted cam cylinders 105 and 106 are angularly aligned, the slanted cam cylinders and drum 14 are revolving in relation to core 26, the cylinders 101 or 102 are actually oscillating back and forth in the bores 100a of component 100, and are supported in the channels 104a of the cam discs 104. Since the diameter of the bores 100a allows cylinders 101 or 102 to revolve on their own axis, the contact between the channels 104a of the cam discs 104 and the ends of cylinders 101 and 102 make the cylinders move in a rotating motion while they oscillate which results in significantly less wear than simple sliding contact of the cylinders against the cam surfaces of cam discs 104. It should be noted that while lubrication will help reduce wear even more, it will not adversely effect the locking action of the clutch-brake mechanism which is caused by the tight fit of cylinders 101 and 102 between the slanted cam cylinders.

The present invention provides a drive release brake assembly which is surprisingly efficient and original in controlling the relative rotation between two rotating components, for example, in a winch with a simple locking device, and is safe and rigid to prevent accidental release in case of motor failure or similar occurrences.

While the invention has been described in terms of its preferred use, it should be understood that, as described in the following claims, the invention is meant to include other equivalent structures, some of which will become evident after further study.

What I claim is:

1. A drive release brake assembly comprising:
   axial core means;
   wedge means carried by said axial core means and including a plurality of axially extending bores, said wedge means being fixed against rotation relative to said core means;
   cam means defining a pair of substantially identical cam surfaces axially carried on either side of said wedge means, said cam surfaces having substantially planar surfaces and being rotatably relative to said core means and to one another;
   means for rotating said cam surfaces between a first angularly aligned position where the axial distance between the facing cam surfaces is substantially equal in all angular positions and a second position out of angular alignment, said axial distance in said aligned first position being greater than the axial length of said wedge means to permit relative rotation between said cam surfaces and said core means, said axial distance in said second unaligned position being less than the axial length of said wedge means to wedge said wedge means between said cam surfaces to prevent the rotation of said cam surfaces relative to said core means.

2. The assembly of claim 1 including a plurality of axially extending cylinders one in each of said bores, each said cylinder being rotatable in its said bore and having one end thereof which is substantially spherical and extending from said bores.

3. The assembly of claim 1 wherein said cam means includes cylinder means having an inclined surface and disc means, one surface of said disc means being supported upon said surface of said cylinder means and the other surface of said disc means including channel means for receiving said wedge means.

4. The assembly of claim 1 wherein said cam surface includes channel means for receiving said wedge means.

5. The assembly of claim 1 wherein said wedge means is movable axially on said core means, but is locked against rotation about said core means, and a plurality of ring means locking said wedge means against said axial movement.

6. The assembly of claim 1 including means for preventing said cam means from axial movement along said core means.

7. The assembly of claim 1 wherein at least one of said axial core means and cam means is rotatable relative to the other.

8. The assembly of claim 1 wherein said core means is fixed against rotation relative to said cam means, said wedge means includes a plurality of axially extending cylinders one in each of said bores, each said cylinder being rotatable in its said bore and having one end thereof extending from said bores and into contact with said cam surfaces.

9. The assembly of claim 8, wherein said cam means are rotatable relative to said axial core means and including channel means for receiving said wedge means.

10. The assembly of claim 9 wherein said cam means includes cylinder means having an inclined surface and disc means, one surface of said disc means being supported upon said cylinder means surface and the other surface of said disc means defining said cam surface.

11. The assembly of claim 9 including rotatable cylindrical drum means in combination with said clutch-brake assembly, said drum means having an axial bore therein containing said clutch-brake assembly, said cam means being fixed in said axial bore to said drum means and rotating therewith, and said axial core means and wedge means being fixed against said rotation of said drum means.

12. The assembly of claim 11 wherein both said cam means and said drum means include peripheral grooves which face each other to define a space therebetween, pin means extending into said spaced defined by said grooves, said pin means aligning the extremities of said grooves causing said cam surfaces to move to said first angularly aligned position, and said pin means being movable from said groove extremities to cause said cam surfaces to move to said second unaligned position to lock said drum means against rotation.

13. The assembly of claim 12 including drive means for rotating said drum, said pin means being coupled to said drive means and being movable in said space in response to said drive means.

14. The assembly of claim 12 wherein movement of said cam surfaces to said second position locks said drum means against rotation in both directions.

15. The assembly of claim 8 including rotatable cylindrical drum means in combination with said clutch-brake assembly, said drum means having an axial bore therein containing said clutch-brake assembly, said cam means being fixed in said axial bore to said drum means and rotating therewith, and said axial core means and wedge means being fixed against said rotation of said drum means.

16. The assembly of claim 15 wherein both said cam means and said drum means include peripheral grooves which face each other to define a space therebetween, pin means extending into said space defined by said grooves, said pin means aligning the extremities of said grooves causing said cam surfaces to move to said first angularly aligned position, and said pin means being movable from said groove extremities to cause said cam surfaces to move to said second unaligned position to lock said drum means against rotation.

17. The assembly of claim 16 including drive means for rotating said drum, said pin means being coupled to said drive means and being movable in said space in response to said drive means.

18. The assembly of claim 15 wherein movement of said cam surfaces to said second position locks said drum means against rotation in both directions.

19. The assembly of claim 1 including rotatable cylindrical drum means in combination with said clutch-brake assembly, said drum means having an axial bore therein containing said clutch-brake assembly, said cam means being fixed in said axial bore to said drum means and rotating therewith, and said axial core means and wedge means being fixed against said rotation of said drum means.

20. The assembly of claim 19 wherein both said cam means and said drum means include peripheral grooves which face each other to define a space therebetween, pin means extending into said space defined by said grooves, said pin means aligning the extremities of said grooves causing said cam surfaces to move to said first angularly aligned position, and said pin means being movable from said groove extremities to cause said cam surfaces to move to said second unaligned position to lock said drum means against rotation.

21. The assembly of claim 20 including drive means for rotating said drum, said pin means being coupled to said drive means and being movable in said space in response to said drive means.

22. The assembly of claim 20 wherein movement of said cam surfaces to said second position locks said drum means against rotation in both directions.

* * * * *